United States Patent
Bottorff et al.

(10) Patent No.: US 8,855,122 B2
(45) Date of Patent: Oct. 7, 2014

(54) BACKBONE PROVIDER BRIDGING NETWORKS

(75) Inventors: Paul Bottorff, Palo Alto, CA (US); Norival Figueira, Campbell, CA (US); Marc Holness, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 907 days.

(21) Appl. No.: 11/159,065

(22) Filed: Jun. 22, 2005

(65) Prior Publication Data

US 2005/0286541 A1    Dec. 29, 2005

Related U.S. Application Data

(60) Provisional application No. 60/582,316, filed on Jun. 23, 2004.

(51) Int. Cl.
*H04L 12/28* (2006.01)
*H04L 12/56* (2006.01)
*H04J 3/16* (2006.01)
*H04L 12/46* (2006.01)

(52) U.S. Cl.
CPC ......... *H04L 12/4658* (2013.01); *H04L 12/2852* (2013.01); *H04L 12/4633* (2013.01); *H04L 12/4625* (2013.01)
USPC .......................................... 370/401; 370/466

(58) Field of Classification Search
USPC .............................. 370/389, 392, 395.53, 401
See application file for complete search history.

(56) References Cited

U.S. PATENT DOCUMENTS

| | | | |
|---|---|---|---|
| 6,618,388 B2 | 9/2003 | Yip et al. | |
| 2002/0089992 A1* | 7/2002 | Yip et al. | 370/401 |
| 2004/0037279 A1 | 2/2004 | Zelig et al. | |
| 2004/0042454 A1 | 3/2004 | Zabihi et al. | |
| 2004/0081171 A1 | 4/2004 | Finn | |
| 2005/0138149 A1* | 6/2005 | Bhatia | 709/220 |

FOREIGN PATENT DOCUMENTS

| | | |
|---|---|---|
| EP | 1398920 A2 | 3/2004 |
| WO | WO03047166 A1 | 6/2003 |

OTHER PUBLICATIONS

Suzuki et al., Backbone Provider Bridge Frame Format Issues, Oct. 2004, pp. 1-8.
Cisco Systems Inc., White Paper: Metro Ethernet WAN Services and Architecture, Cisco White Paper, XX, XX, Jul. 27, 2003, pp. 1-26 XP-002320211.
Supplementary European Search Report from corresponding European Patent Application 05761862.1, Jan. 24, 2014.

* cited by examiner

*Primary Examiner* — Chirag Shah
*Assistant Examiner* — Srinivasa Reddivalam
(74) *Attorney, Agent, or Firm* — Anderson Gorecki & Rouille LLP

(57) ABSTRACT

An edge device is used to support a backbone provider bridging network to facilitate interconnection of a plurality of networks. The edge device is coupled between the backbone and a first one of the networks, and is operable to encapsulate data units received from the first network with a header, and to forward the encapsulated data unit to the backbone. The header is indicative of a tunnel that is used to support traffic from the first network to a second network over the backbone. The edge device also de-encapsulates data units received from the backbone that are destined for the first network.

12 Claims, 5 Drawing Sheets

BACKBONE PROVIDER BRIDGING NETWORKS

CROSS-REFERENCE TO RELATED APPLICATIONS

A claim of priority is made to U.S. Provisional Patent Application Ser. No. 60/582,316, entitled Backbone Provider Bridging Networks, filed Jun. 23, 2004, which is incorporated by reference.

FIELD OF THE INVENTION

This invention relates generally to the field of network communications, and more particularly to interconnection of provider bridge networks.

BACKGROUND OF THE INVENTION

Entry of new communications service providers into the marketplace combined with the breakup of some state-regulated communications monopolies has resulted in increased network complexity. In particular, communications services that might once have been supplied by a single service provider may now require interaction between the individual bridge networks of multiple service providers. Pairs of provider bridge networks may be interconnected on a 1:1 basis using bridges. However, these bridges are costly, and the number of bridges required to interconnect multiple service providers in a mesh increases exponentially relative to the number of service providers. Further, the frame replicators needed to connect a large number of points limits performance.

The problem is further exacerbated because multipoint connection circuits are becoming increasingly important in provider networks as providers deploy more diverse service offerings. Existing techniques for interconnection of provider bridged networks have poor scaling properties for multipoint connection circuits. This is in part due to the limits of current technologies which have difficulty scaling the number of replicator elements required to support traffic splitting for multipoint connections and the fact that the number of possible multipoint paths grows as 2**N, where N is the number of nodes.

SUMMARY OF THE INVENTION

In accordance with one embodiment of the invention, apparatus for facilitating interconnection of a plurality of provider networks includes an edge device coupled between a backbone and a first one of the provider networks, the edge device being operable to encapsulate data units received from the first provider network with a header, and to forward the encapsulated data unit to the backbone, the header being indicative of a tunnel that is used to support traffic from the first provider network over the backbone.

In accordance with another embodiment of the invention, a method for facilitating interconnection of a plurality of provider networks includes the steps of: encapsulating, by an edge device, data units received from a first provider network with a header, the header being indicative of a tunnel that is used to support traffic from the first provider network over the backbone; and forwarding the encapsulated data unit to the backbone.

In accordance with another embodiment of the invention, a method for facilitating transporting a plurality of point-to-point, point-to-multipoint, and multi-point-to-multipoint connections over a carrier network includes the steps of: encapsulating, by an edge device data units received from a first provider bridge with a header, the header being indicative of a tunnel that is used to support traffic from point in the provider network to one or many other points in the provider network; and forwarding the encapsulated data unit.

One advantage of the invention is that the edge devices support hierarchical backbones that are readily scalable. In addition, the hierarchy created in the backbones creates relatively small multicast domains, each domain having a small number of bridges. With such an arrangement, the number of multipoint tunnels and replication is limited, and scaling is greatly improved.

DETAILED DESCRIPTION

Figure 1:
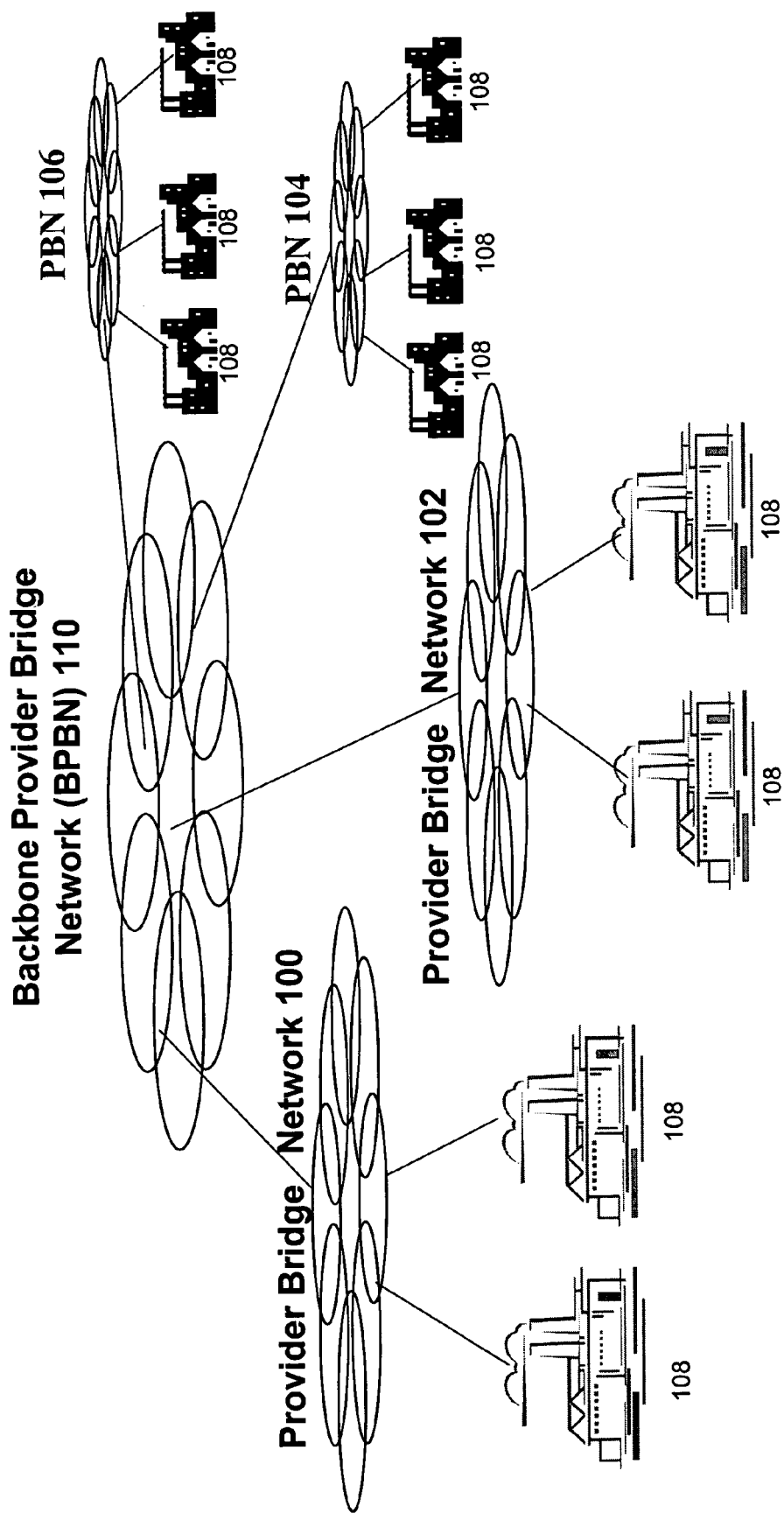
FIG. 1 illustrates a Backbone Provider Bridge Network ("BPBN") for interconnecting multiple Provider Bridge Networks ("PBNs").

Referring now to FIG. 1, a Provider Bridge Networks ("PBNs") (100, 102, 104, 106) are individually used to interconnect different aggregation points (108) in the respective networks of different service providers. For example, a PBN may interconnect Points-of-Presence ("PoPs"), Central Offices ("COs"), and enterprise customers. A Backbone Provider Bridging Network ("BPBN") (110) is used to interconnect the PBNs. In particular, a single BPBN (110) may be used to interconnect any number of PBNs. Thus, the BPBN is a single resource across which a PBN can exchange communication with all other PBNs. In the illustrated example the BPBN interconnects with the PBNs via IEEE 802.1ad interfaces.

Figure 2:
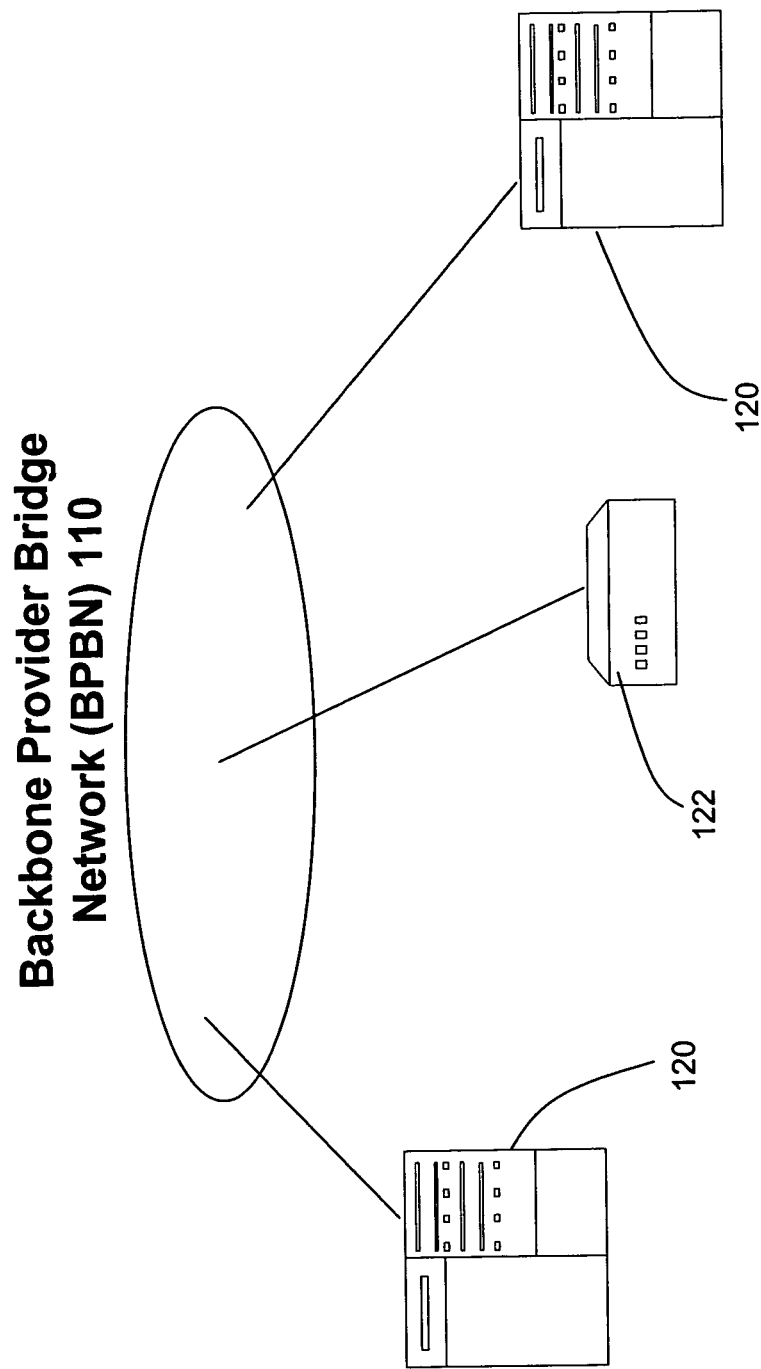
FIG. 2 illustrates an alternative embodiment without PBNs.

FIG. 2 illustrates an alternative embodiment in which the BPBN is operated without PBNs. In the illustrated example the BPBN (110) interconnects switch/routers (120) and a server (122) associated with one or more service provider networks. However, the BPBN may be employed to interconnect any suitable network equipment and types of networks. Further, although illustrated as a ring architecture, the BPBN can be implemented as a mesh or any other suitable architecture.

Figure 3:
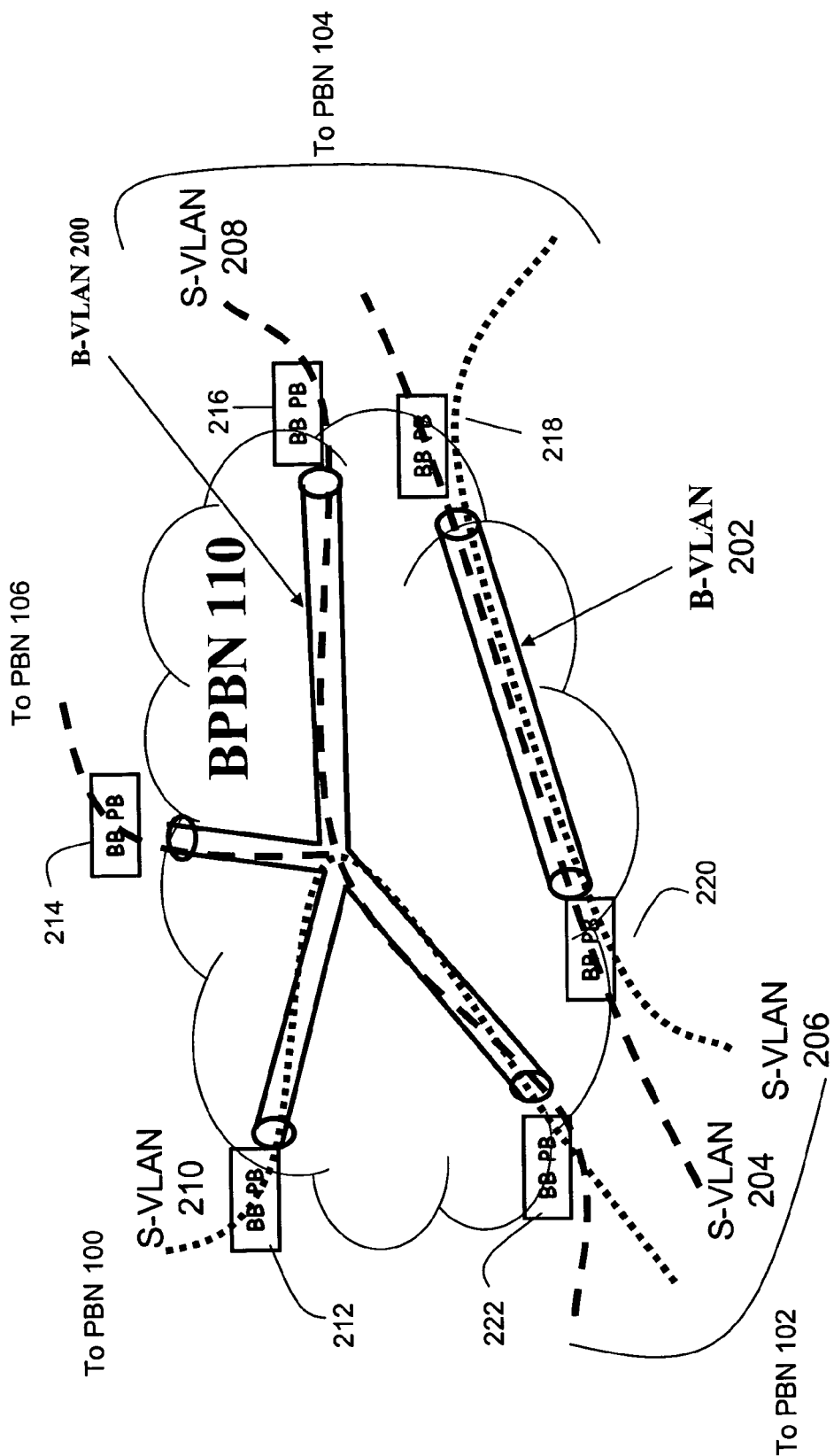
FIG. 3 illustrates use of multi-point B-VLANs in the BPBN of FIG. 1.

FIG. 3 illustrates communications across the BPBN (110) of FIG. 1 in greater detail. The BPBN includes Backbone-VLANs ("B-VLANs") (200, 202) which interconnect selected PBNs. For example, B-VLAN (200) interconnects PBN (100), PBN (102), PBN (104) and PBN (106). B-VLAN (202) interconnects PBN (102) and PBN (104). Each B-VLAN supports at least one Service-VLAN ("S-VLAN"). S-VLANs can provide point-to-point communications between pairs of PBNs. For example, S-VLAN (204) and S-VLAN (206) each interconnect PBN (102) with PBN (104) via B-VLAN (202). Similarly, S-VLAN (208) interconnects PBN (102), PBN (104) and PBN (106) via B-VLAN (200). Further, S-VLAN (210) interconnects PBN (100) with PBN (102) via B-VLAN (200). In one embodiment point-to-point S-VLANs interconnect every possible PBN pairing, and all S-VLANs are carried on a single multi-point B-VLAN, thereby providing interconnection between all endpoints.

Backbone Provider Bridge Edge ("BBPB") devices (212, 214, 216, 218, 220, 222) facilitate operation of the B-VLANs and S-VLANs. Each PBN is associated with at least one BBPB device. Each BBPB is operable to encapsulate frames received from its associated PBN and destined for a different PBN. In particular, the BBPB encapsulates the frames in a data unit having a BPBN header. The BPBN header includes an Extended Service-VLAN Identifier ("ES-VID") which identifies the S-VLAN associated with the PBN S-VIDs on the BPBN. The BPBN header also includes a Backbone-VLAN Identifier ("B-VID"). The B-VID identifies a Backbone VLAN tunnel that is used to transport the S-VLANs over the BPBN. B-VLAN tunnels can be point-to-point or multi-point in nature. Each BBPB is further operable to receive encapsulated frames from corresponding BBPBs associated with other PBNs. Upon receipt of an encapsulated frame from another PBN the BBPB is operative to de-encapsulate the frame by removing the BPBN header. The frame is then forwarded toward its destination in the target PBN.

Figure 4:
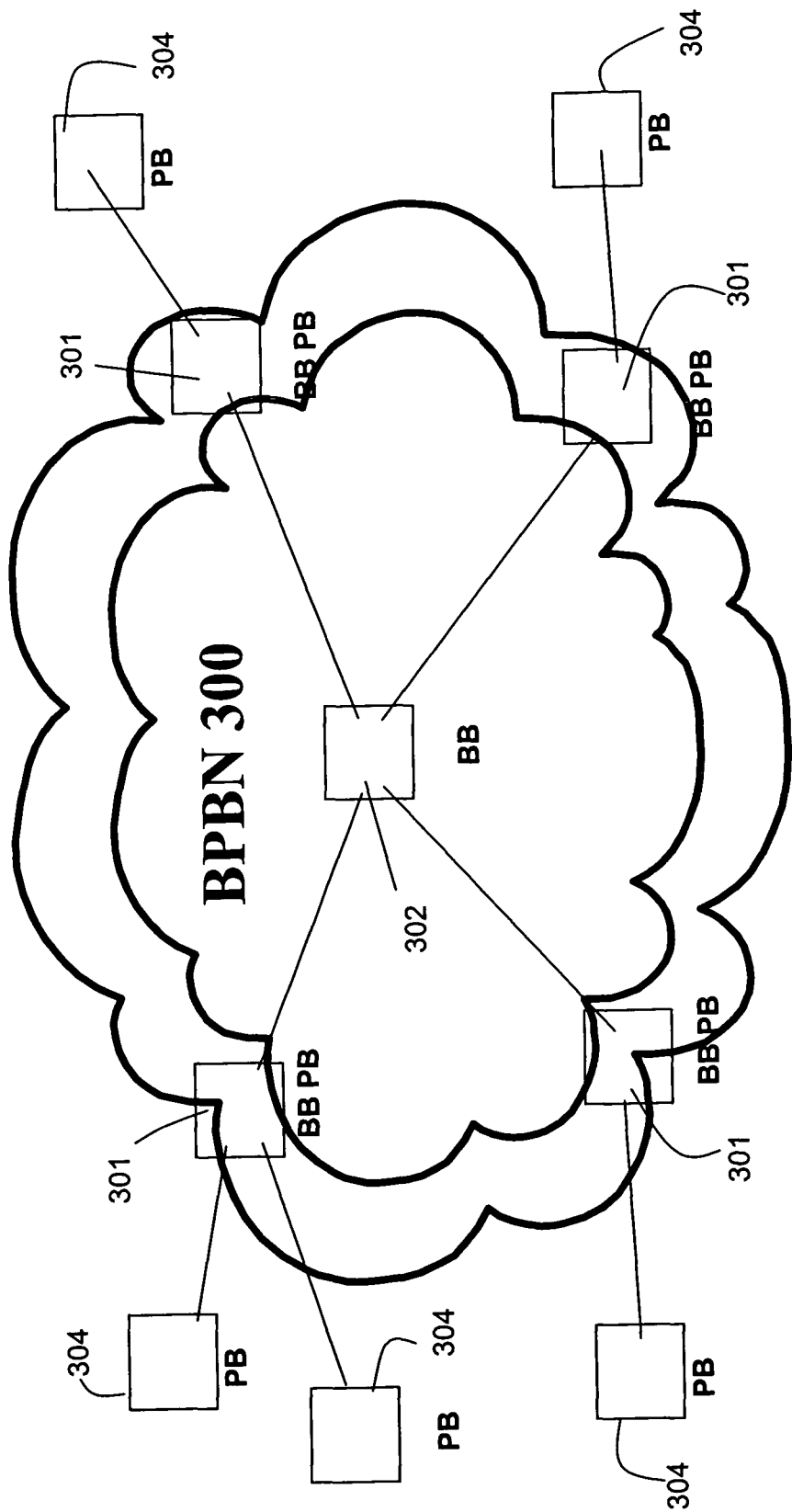
FIG. 4 illustrates a simple BPBN hierarchy.
Figure 5:
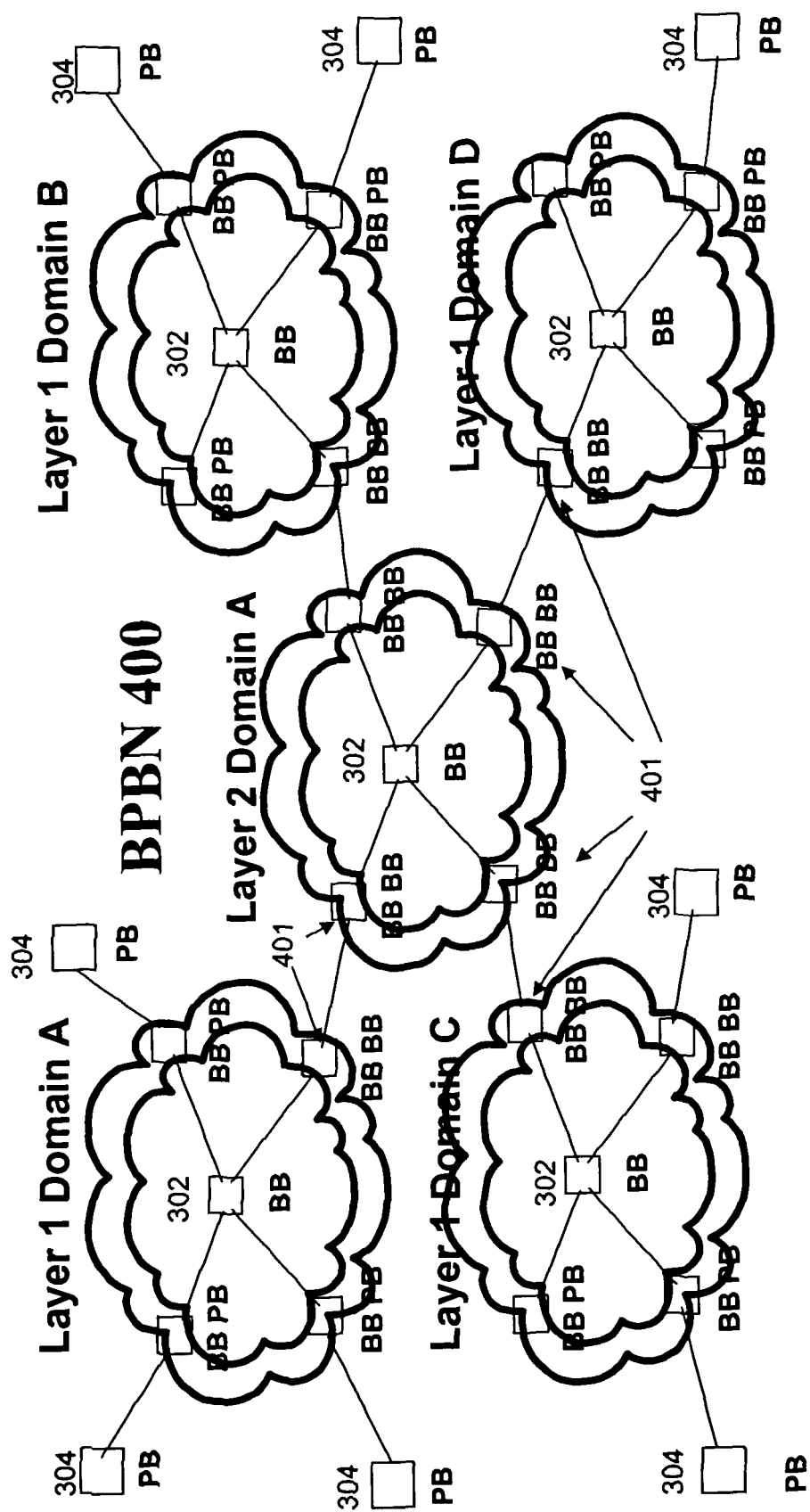
FIG. 5 illustrates a multi-level BPBN hierarchy.

Referring now to FIGS. 4 and 5, a BPBN (300, 400) may be organized hierarchically to facilitate scaling. The BPBN illustrated in FIG. 4 has a single layer hierarchy while the BPBN illustrated in FIG. 5 has a two layer hierarchy. It should be noted that any number of layers can be implemented. In the single-layer embodiment BBPBs (301) are connected by a BackBone ("BB") device (302). The BBPB edge devices (301) encapsulate PBN frames received from associated Provider Bridge ("PB") devices (304). In particular, the BBPB devices (301) encapsulate the frames with a BPBN header by swapping the S-VID to/from a larger ES-VID and creating a B-VID from the ES-VID. The BBPB edge devices (301) also de-encapsulate frames to be transmitted to associated PBN devices (304) by stripping the BPBN header, swapping the ES-VID to an S-VID for the PBN, and removing the final B-VID. Both S-VI) and ES-VID identify the S-VLAN carried through the PBNs and BPBN.

In the case of the multi-layer hierarchy illustrated in FIG. 5, BB-BB layer edge bridge devices (401) interconnect BPBN layers. In particular, the BB-BB devices (401) swap the B-VID of frames to a new B-VID based on the ES-VID. The new B-VID allows transport over the current BPBN multicast domain ("MC-DOM"). Source route addressing (with Backbone Connectivity identifier stacking) can also be used to avoid the need for table lookups and B-VID swapping at layer boundaries. The ES-VID is the same throughout the BPBN. The ES-VID is swapped with the S-VID at the BB-PB edge. The B-VID is preferably large enough to address all possible multi-point tunnels within a given layer domain, e.g., 12 bits is enough to support twelve BB bridges in a layer. One advantage of hierarchical BPBNs is that they are readily scalable. In addition, the hierarchy of BPBN bridges creates relatively small multicast domains, each domain having a small number of bridges. With such an arrangement, the number of multi-point tunnels in any single domain and replication in any single domain is limited, while the number of multipoint tunnels throughout the network becomes limitless.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. For example, the BPBN may be implemented with or without PBNs. Accordingly, the invention should not be viewed as limited except by the scope and spirit of the appended claims.

What is claimed is:

1. Apparatus for a highly scalable hierarchical multipoint provider bridge network for facilitating interconnection of a plurality of provider networks, comprising:
an edge device coupled between a backbone and a first one of the provider networks, the edge device being operable to encapsulate a data unit received from the first provider network with a header, and to forward the encapsulated data unit to the backbone, the header being indicative of a tunnel that is used to support traffic from the first provider network over the backbone;
wherein the tunnel is associated with a Virtual Local Area Network ("VLAN") including at least one Backbone-VLAN ("B-VLAN") which supports at least one Service-VLAN (S-VLAN);
wherein the edge device is operable to process a data unit destined for another provider bridge network to replace a Service-VLAN identifier (S-VID) of a data unit with an Extended Service-VLAN identifier (ES-VID) which identifies an S-VLAN associated with the provider bridge network; and
wherein the header further includes a Backbone VLAN Identifier ("B-VID") which is indicative of a Backbone VLAN tunnel that is used to transport the S-VLANs over the backbone for one level of a plurality of hierarchical levels.

2. The apparatus of claim 1 wherein the edge device is operable to transmit the data unit to selected ones of a plurality of provider bridge networks other than the first provider bridge via the tunnel.

3. The apparatus of claim 1, wherein the header includes an Extended Service VLAN Identifier ("ES-VID") which is uniquely indicative within a backbone provider bridge network of a Service-VLAN associated with a destination provider bridge network Service-VLAN identifier ("S-VID").

4. The apparatus of claim 3 wherein the edge device is further operable to de-encapsulate a data unit received from the backbone, and to forward the de-encapsulated data unit to the first provider bridge.

5. The apparatus of claim 4 wherein the edge device is operable to replace the ES-VID with an S-VID.

6. The apparatus of claim 5 wherein the edge device is operable to remove the B-VID.

7. A method for facilitating interconnection of a plurality of provider networks, comprising the steps of:
encapsulating, by an edge device, a data unit received from a first provider network with a header, the header being indicative of a tunnel that is used to support traffic from the first provider network over the backbone, wherein the tunnel is associated with a Virtual Local Area Network ("VLAN") including at least one Backbone-VLAN ("B-VLAN") which supports at least one Service-VLAN (S-VLAN);
replacing a Service-VLAN identifier (S-VID) in the header with an Extended Service-VLAN identifier (ES-VID) which identifies an S-VLAN associated with a provider bridge network;
inserting into the header a Backbone VLAN Identifier ("B-VID") which is indicative of a Backbone VLAN tunnel that is used to transport the S-VLANs over the backbone for one level of a plurality of hierarchical levels; and
forwarding the encapsulated data unit to the backbone.

8. The method of claim 7 including the further step of transmitting, by the edge device, the data unit to selected ones of a plurality of provider bridge networks other than the first provider bridge via the tunnel.

9. The method of claim 8 including the further step of the edge device de-encapsulating a data unit received from the backbone, and forwarding the de-encapsulated data unit to the first provider bridge.

10. The method of claim 9 including the further step of the edge device replacing the ES-VID with an S-VID.

11. The method of claim 10 including the further step of the edge device removing the B-VID.

12. A method for facilitating transporting a plurality of point-to-point, point-to-multipoint, and multipoint-to-multipoint connections over a carrier network, comprising the steps of:
- encapsulating, by an edge device, a data unit received from a first carrier network with a header, the header being indicative of a tunnel that is used to support traffic from a point in the first carrier network to at least one other point in a second carrier network, wherein the tunnel is associated with a Virtual Local Area Network ("VLAN") including at least one Backbone-VLAN ("B-VLAN") which supports at least one Service-VLAN (S-VLAN);
- replacing a Service-VLAN identifier (S-VID) in the header with an Extended Service-VLAN identifier (ES-VID) which identifies an S-VLAN associated with a provider bridge network;
- inserting into the header a Backbone VLAN Identifier ("B-VID") which is indicative of a Backbone VLAN tunnel that is used to transport the S-VLANs over the backbone for one level of a plurality of hierarchical levels; and
- forwarding the encapsulated data unit.

\* \* \* \* \*